US012729842B1

(12) United States Patent
Du

(10) Patent No.: US 12,729,842 B1
(45) Date of Patent: Sep. 8, 2026

(54) RECHARGEABLE LED LAMP WITH MAGNETIC BASE

(71) Applicant: THE LAMPS FACTORY(HK) LIMITED, Hong Kong (CN)

(72) Inventor: Min Du, Dongguan City (CN)

(73) Assignee: THE LAMPS FACTORY(HK) LIMITED, Hong Kong (HK)

(*) Notice: Subject to any disclaimer, the term of this patent is extended or adjusted under 35 U.S.C. 154(b) by 0 days.

(21) Appl. No.: 19/173,177

(22) Filed: Apr. 8, 2025

(51) Int. Cl.

| | |
|---|---|
| ***F21V 21/096*** | (2006.01) |
| ***F21L 4/08*** | (2006.01) |
| ***F21V 23/04*** | (2006.01) |
| ***F21V 23/06*** | (2006.01) |
| *F21Y 107/30* | (2016.01) |
| *F21Y 113/17* | (2016.01) |
| *F21Y 115/10* | (2016.01) |

(52) U.S. Cl.
CPC .......... *F21V 21/0965* (2013.01); *F21L 4/085* (2013.01); *F21V 23/0428* (2013.01); *F21V 23/06* (2013.01); *F21Y 2107/30* (2016.08); *F21Y 2113/17* (2016.08); *F21Y 2115/10* (2016.08)

(58) Field of Classification Search
CPC .... F21V 21/0965; F21V 21/096; F21V 21/08; F21L 4/027; F21Y 210/30
See application file for complete search history.

(56) References Cited

U.S. PATENT DOCUMENTS

| | | | | |
|---|---|---|---|---|
| 5,890,794 | A * | 4/1999 | Abtahi | F21K 9/00 362/267 |
| 6,688,752 | B2 * | 2/2004 | Moore | F21S 10/04 315/200 A |
| 7,014,337 | B2 * | 3/2006 | Chen | F21V 19/0045 362/240 |
| 8,072,345 | B2 * | 12/2011 | Gallo | F21S 43/19 340/815.45 |
| 11,181,248 | B1 * | 11/2021 | Kothari | F21V 23/007 |
| 11,293,632 | B2 * | 4/2022 | Du | F21K 9/232 |
| 12,055,277 | B2 * | 8/2024 | Green, Jr. | F21V 3/061 |
| 12,203,609 | B2 * | 1/2025 | Rizvi | F21V 29/773 |
| 2008/0106430 | A1 * | 5/2008 | Yeh | F21S 43/26 340/815.73 |
| 2013/0250566 | A1 * | 9/2013 | Nishiie | F21V 29/81 362/217.05 |
| 2015/0091451 | A1 * | 4/2015 | Williams | H05B 45/10 315/160 |
| 2020/0263855 | A1 * | 8/2020 | Young | F21V 15/01 |
| 2025/0122983 | A1 * | 4/2025 | Neal | F21V 23/06 |

* cited by examiner

*Primary Examiner* — Ismael Negron

(57) ABSTRACT

A bulb includes a main body and a base. The main body includes a translucent hollow outer tube defining a first cavity, a hollow inner tube, a light emitting component provided inside the accommodating cavity, and having a plurality of LED bead mounted on a flexible circuit board attached to the inner tube, a rechargeable battery provided inside the accommodating cavity, a base connected to one end of the outer tube, a top cover connected to another end of the outer tube, a magnet provided inside the base to fix the bulb to a support surface, a charging interface configured to charge the battery, and a touch sensing switch provided in the top cover and configured to select a lighting mode.

20 Claims, 3 Drawing Sheets

RECHARGEABLE LED LAMP WITH MAGNETIC BASE

TECHNICAL FIELD

The present invention relates to the field of bulbs, particularly to a multifunctional rechargeable magnetic attraction bulb.

BACKGROUND ART

With the continuous development of technology and the improvement of life quality of people, the demand for lighting equipment is increasing day by day. Modern society not only requires the lighting equipment to have basic lighting functions, but also pays more attention to convenience and aesthetics.

Traditional bulbs are usually installed with wires or fixing devices, which often brings inconvenience to daily use, especially in places that require frequent movement or rearrangement, such as homes, offices, and outdoor spaces.

Therefore, there is an urgent need for a bulb on the market that can be easily installed and disassembled to adapt to different environments and improve user experience.

SUMMARY

In order to overcome the shortcomings of the prior art, the present invention provides a multifunctional rechargeable magnetic attraction bulb, which can be easily installed and disassembled to adapt to different environments, thereby improving user experience.

The technical solution adopted by the present invention to solve its technical problem is as follows.

The present invention provides a multifunctional rechargeable magnetic attraction bulb, including:

- a main body, wherein the main body includes a hollow outer tube, the outer tube is capable of transmitting light, a first accommodating cavity is defined in the outer tube, and a light emitting component is provided inside the first accommodating cavity; the main body also includes a hollow inner tube, and the hollow inner tube is positioned inside the first accommodating cavity; and
- a base, wherein the base is connected to one end of the outer tube, a magnetic attraction member is provided inside the base, and the base is attracted and connected to an attractable object through the magnetic attraction member.

As an improvement of the present invention, one end of the base attracted and connected to the attractable object is a flat end surface.

As an improvement of the present invention, another end of the outer tube away from the base is connected to a top cover. The top cover is equipped with a touch sensing switch.

As an improvement of the present invention, both the base and the top cover are cylindrical bodies with an identical diameter to the outer tube.

As an improvement of the present invention, the main body also includes a hollow inner tube. The hollow inner tube is positioned in the first accommodating cavity. The light emitting component includes a circuit board and a light emitting element. The light emitting element is arranged on the circuit board. The circuit board is arranged on the hollow inner tube. The light emitting element includes at least one LED bead.

As an improvement of the present invention, the circuit board is a flexible integrated circuit board. The flexible integrated circuit board is bent around to form an annular circuit board. The flexible integrated circuit board is arranged around the hollow inner tube. The light emitting element is arranged around one side of the flexible integrated circuit board facing the outer tube.

As an improvement of the present invention, the light emitting element includes a plurality of LED beads. The plurality of LED beads are uniformly arranged around the flexible integrated circuit board.

As an improvement of the present invention, the LED beads are attached to the flexible integrated circuit board through surface mount technology. The flexible integrated circuit board is attached to a surface of the hollow inner tube through adhesive.

As an improvement of the present invention, a total number of the LED beads is sixty. The sixty LED beads are divided into six layers. Each layer is arranged and distributed with ten of the LED beads.

As an improvement of the present invention, the touch sensing switch is used for adjusting a light emitting mode of the LED beads. When the touch sensing switch receives a first touch control signal, the touch sensing switch is used for switching the LED beads to a first light emitting mode. When the touch sensing switch receives a second touch control signal, the touch sensing switch is used for switching the LED beads to a second light emitting mode. When the touch sensing switch receives a third touch control signal, the touch sensing switch is used for switching the LED beads to a third light emitting mode.

As an improvement of the present invention, the first light emitting mode, the second light emitting mode, and the third light emitting mode are all different light emitting modes from each other.

As an improvement of the present invention, the first light emitting mode is yellow light, the second light emitting mode is white light, and the third light emitting mode is mixed light of yellow light and white light.

As an improvement of the present invention, the magnetic attraction member is a magnet positioned inside the base.

As an improvement of the present invention, the magnet is a cylindrical magnet.

As an improvement of the present invention, the base is a metal base, and the top cover is a metal top cover.

As an improvement of the present invention, the outer tube is a translucent plastic outer tube. The hollow inner tube is an aluminum hollow inner tube.

As an improvement of the present invention, the outer tube is circumferentially rotatable between the base and the top cover.

As an improvement of the present invention, the base is equipped with an indicator lamp. The indicator lamp is used for displaying a charging state of the multifunctional rechargeable magnetic attraction bulb.

As an improvement of the present invention, the base is equipped with a rechargeable battery and a charging interface electrically connected to the rechargeable battery. The rechargeable battery is electrically connected to the light emitting component for power supply.

As an improvement of the present invention, a height of the multifunctional rechargeable magnetic attraction bulb is in a range from 30 mm to 200 mm. A diameter of the multifunctional rechargeable magnetic attraction bulb is in a range from 10 mm to 100 mm. A height of the outer tube is in a range from 10 mm to 180 mm. A diameter of the outer tube is in a range from 10 mm to 100 mm. A height of the base is in a range from 5 mm to 100 mm. A diameter of the base is in a range from 10 mm to 100 mm. A diameter of the top cover is in a range from 5 mm to 100 mm. A height of the top cover is in a range from 10 mm to 100 mm.

Beneficial effects of the present invention are as follows. The present invention provides the multifunctional rechargeable magnetic attraction bulb. The multifunctional rechargeable magnetic attraction bulb includes the main body and the base. The main body includes the hollow outer tube. The outer tube is capable of transmitting light. The first accommodating cavity is defined in the outer tube. The light emitting component is provided inside the first accommodating cavity. The base is connected to one end of the outer tube. A magnetic attraction member is provided inside the base. The base is attracted and connected to the attractable object through the magnetic attraction member. With the above structure, since the light emitting component is positioned inside the light-transmissible outer tube, the light emitted by the light emitting component passes through the light-transmissible outer tube and is emitted. By using the base with a magnetic attraction structure, the bulb can be easily attracted to various attractable objects, and a user has no need to use tools or power cords for fixation, thereby greatly facilitating the movement and rearrangement of the bulb, and catering to the lighting needs of different places.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
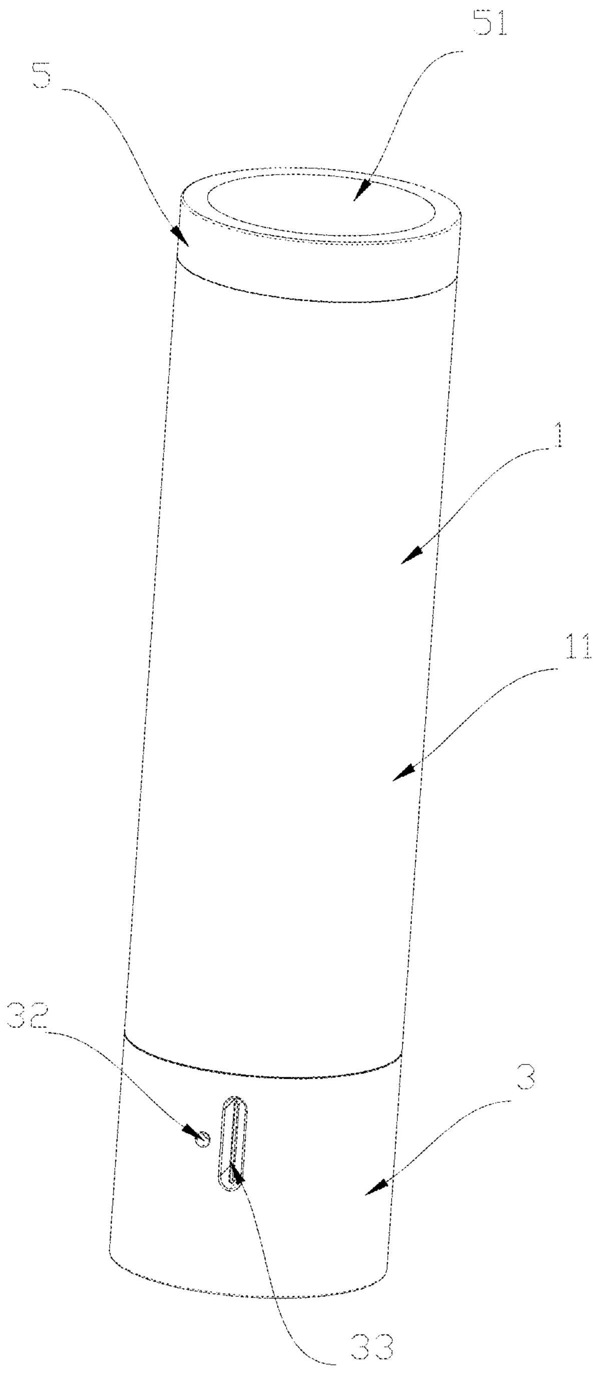
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
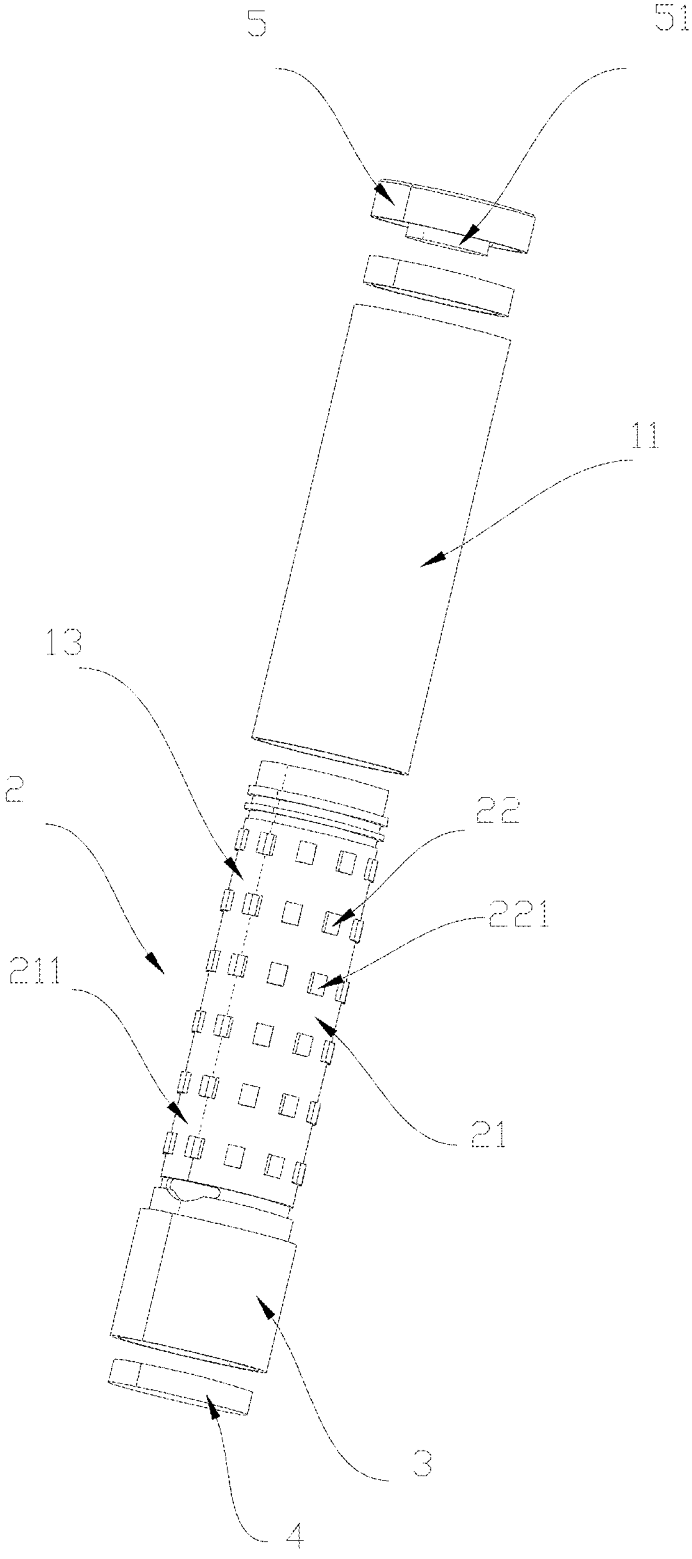
FIG. 2 is an exploded view of the present invention.
Figure 3:
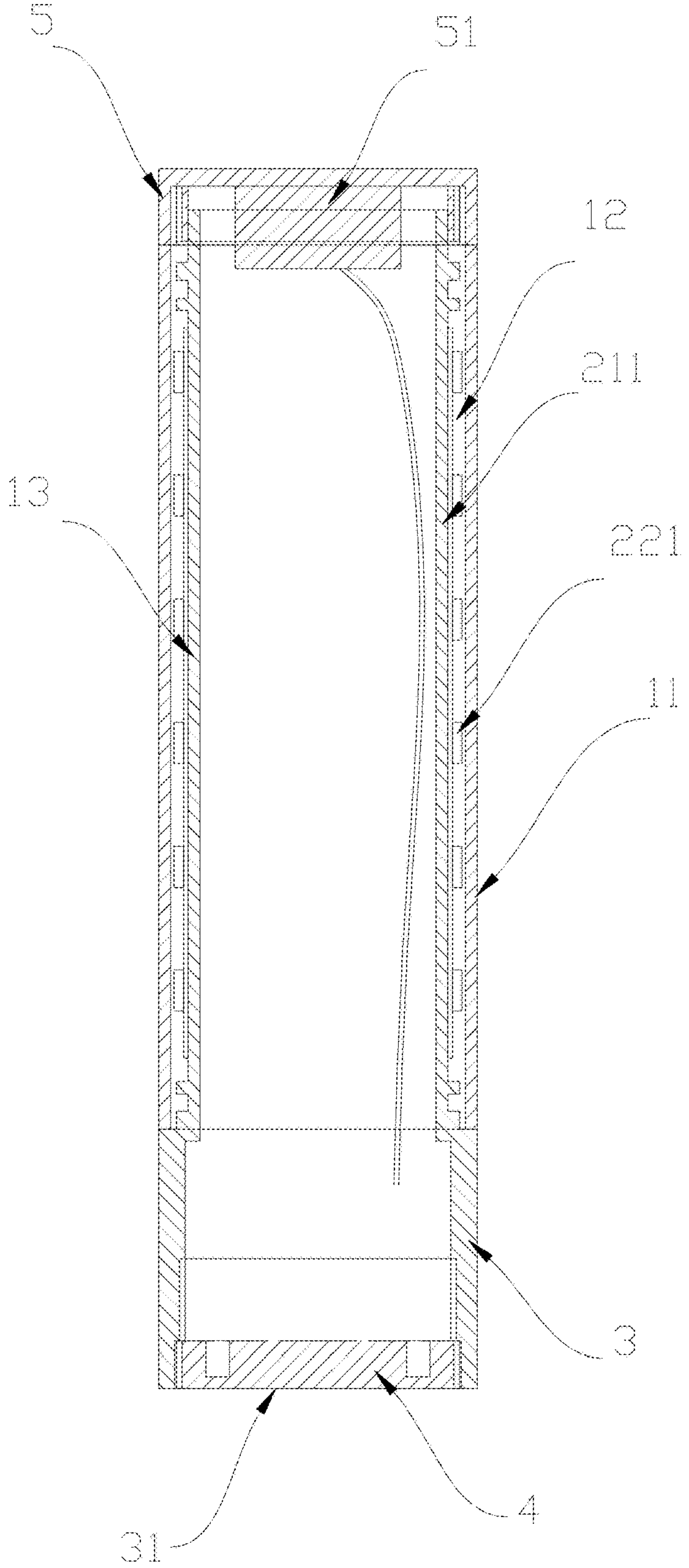
FIG. 3 is a sectional view of the present invention taken along a circuit board.

Referring to FIGS. 1-3, a multifunctional rechargeable magnetic attraction bulb includes:

- a main body 1, wherein the main body 1 includes a hollow outer tube 11, the outer tube 11 is capable of transmitting light, a first accommodating cavity 12 is defined in the outer tube 11, and a light emitting component 2 is provided inside the first accommodating cavity 12; the main body 1 also includes a hollow inner tube 13, and the hollow inner tube 13 is positioned inside the first accommodating cavity; and
- a base 3, wherein the base 3 is connected to one end of the outer tube 11, a magnetic attraction member 4 is provided inside the base 3, and the base 3 is attracted and connected to an attractable object through the magnetic attraction member 4.

With the above structure, since the light emitting component 2 is positioned inside the outer tube 11, the light emitted by the light emitting component 2 passes through the outer tube 11 and is emitted. By using the base 3 with a magnetic attraction structure, the bulb can be easily attracted to various attractable objects, and a user has no need to use tools or power cords for fixation, thereby greatly facilitating the movement and rearrangement of the bulb, and catering to the lighting needs of different places.

In this embodiment, one end of the base 3 attracted and connected to the attractable object is a flat end surface 31. With the above structure, the user can directly align the flat end surface 31 with a desired position for attraction when installing the bulb. The operation is simple and intuitive, without the need to adjust an angle or a position. The base 3 designed to be flat can ensure that the bulb can be stably placed on various surfaces, effectively increasing contact with the surface, reducing the danger caused by tilting or sliding of the bulb, and ensuring the stability of the bulb in use.

In this embodiment, another end of the outer tube 11 away from the base 3 is connected to a top cover 5. The top cover 5 is equipped with a touch sensing switch 51. With the above structure, due to the touch sensing switch 51 provided on the top cover 5, the user can control a light emitting mode of the light emitting component 2 through the touch sensing switch 51 arranged on the top cover 5. Compared with independent switches of existing bulbs, the bulb of the present invention is smaller in size, occupies less space, and has a more beautiful appearance.

In this embodiment, both the base 3 and the top cover 5 are cylindrical bodies with an identical diameter to the outer tube 11. Specifically, the top cover 5, the outer tube 11, and the base 3 are sequentially connected to form a complete cylindrical shape. With the above structure, the cylindrical design of the bulb gives the bulb a more design-forward look, while reducing the product's volume, thereby making it easier for the user to carry and transport.

In this embodiment, the light emitting component 2 includes a circuit board 21 and a light emitting element 22. The light emitting element 22 is arranged on the circuit board 21. The circuit board 21 is arranged on the hollow inner tube 13. The light emitting element 22 includes at least one LED bead 221.

Furthermore, the circuit board 21 is a flexible integrated circuit board 211. The flexible integrated circuit board 211 is bent around to form an annular shape. The flexible integrated circuit board 211 is arranged around the hollow inner tube 13. The light emitting element 22 is arranged around one side of the flexible integrated circuit board 211 facing the outer tube 11. With the above structure, the circuit board 21 is the flexible integrated circuit board 211, the circuit board 21 is designed to be bent into the annular shape through its flexible characteristics, and the circuit board 21 is placed in the accommodating cavity of the outer tube 11, so that the light emitted by the light emitting element 22 can be emitted in a 360-degree manner, thereby effectively realizing the 360-degree light emission of the multifunctional rechargeable magnetic attraction bulb.

In this embodiment, the light emitting element 22 includes a plurality of LED beads 221. The plurality of LED beads 221 are uniformly arranged around the flexible integrated circuit board 211. With the above structure, the uniformly arranged LED beads 221 make the light emitted by the bulb softer and more uniform, which can prevent the user from experiencing eye fatigue due to long-term use, and allow the user to use a screen standing lamp for a long time, thereby greatly improving the user experience.

In this embodiment, the LED beads 221 are attached to the flexible integrated circuit board 211 through surface mount technology. The flexible integrated circuit board 211 is attached to a surface of the hollow inner tube 13 through adhesive. With the above structure, due to the LED beads 221 being attached to the flexible integrated circuit board 211 through surface mount technology, the LED beads 221 can be directly connected to the integrated circuit board 21, greatly saving space while reducing the problems of insufficient soldering and poor contact during the soldering process, thus improving the reliability of the product.

Specifically, a total number of the LED beads 221 is sixty. The sixty LED beads 221 are divided into six layers. Each layer is arranged and distributed with ten of the LED beads 221. With the above structure, the arrangement and distribution design of the sixty LED beads 221 in six layers, with ten of the LED beads per layer, fully utilizes the position space of the circuit board 21, ensuring that enough LED beads 221 are evenly distributed within the limited storage space, thus greatly improving the brightness of the bulb.

In this embodiment, the touch sensing switch 51 is used for adjusting a light emitting mode of the LED beads 221. When the touch sensing switch 51 receives a first touch control signal, the touch sensing switch 51 is used for switching the LED beads 221 to a first light emitting mode. When the touch sensing switch 51 receives a second touch control signal, the touch sensing switch 51 is used for switching the LED beads 221 to a second light emitting mode. When the touch sensing switch 51 receives a third touch control signal, the touch sensing switch 51 is used for switching the LED beads 221 to a third light emitting mode. Furthermore, the first light emitting mode, the second light emitting mode, and the third light emitting mode are all different light emitting modes from each other. Furthermore, the first light emitting mode is yellow light, the second light emitting mode is white light, and the third light emitting mode is mixed light of yellow light and white light. Specific steps are as follows: when the touch sensing switch 51 is touched for the first time, the touch sensing switch 51 switches the LED beads 221 to yellow light; when the touch sensing switch 51 is touched for the second time, the touch sensing switch 51 switches the LED beads 221 to white light; when the touch sensing switch 51 is touched for the third time, the touch sensing switch 51 switches the LED beads 221 to mixed light of yellow light and white light; and when the touch sensing switch 51 is touched for the fourth time, the touch sensing switch 51 turns off the LED beads 221. With the above structure, three-stage touch stepless dimming effectively realizes the function of adjustable light emitting mode of the multifunctional rechargeable magnetic attraction bulb, making the multifunctional rechargeable magnetic attraction bulb more intelligent and multifunctional.

In this embodiment, the magnetic attraction member 4 is a magnet positioned inside the base 3. Specifically, the magnet is a cylindrical magnet. In other embodiments, the magnet may also be a square, triangular, or irregularly shaped magnet.

In this embodiment, both the base 3 and the top cover are made of metal. With the above structure, the top cover 5 makes the multifunctional rechargeable magnetic attraction bulb more technological and aesthetically pleasing.

In this embodiment, the outer tube 11 is made of translucent plastic. Specifically, the outer tube 11 is milky white translucent. With the above structure, the outer tube 11 can make the light emitted by the bulb softer and more uniform, improve the lighting effect, and not cause discomfort to the user's eyes.

In this embodiment, the outer tube 11 is circumferentially rotatable between the base 3 and the top cover 5. Furthermore, a first position limiting member is provided at a connection area between the base 3 and the outer tube 11. A second position limiting member is provided at a connection area between the top cover 5 and the outer tube 11. Under the limiting action of the first position limiting member and the second position limiting member, the outer tube 11 is limited and fixed between the top cover 5 and the base 3 and is circumferentially rotatable. Specifically, the first position limiting member and the second position limiting member can be position limiting devices such as the engagement between an engaging buckle and an engaging slot. With the above structure, it is effectively achieved that the outer tube 11 is connected and fixed between the base 3 and the top cover 5 while being circumferentially rotatable.

In this embodiment, the base 3 is equipped with an indicator lamp 32. The indicator lamp 32 is used for displaying a charging state of the multifunctional rechargeable magnetic attraction bulb. With the above structure, the indicator lamp 32 is capable of emitting red light or other colored lights when powered on, allowing a customer to promptly find out whether the charging is in a normal state and improving the convenience of using the product.

In this embodiment, the base 3 is equipped with a rechargeable battery and a charging interface 33 electrically connected to the rechargeable battery. The rechargeable battery is electrically connected to the light emitting component 2 for power supply. The charging interface 33 can be a Type-C interface, a USB interface, a DC interface, or the like. With the above structure, the user can insert a data cable into the charging interface, and the data cable can be connected to an external power source such as a power plug, a computer, or a power bank to charge the multifunctional rechargeable magnetic attraction bulb at any time. Moreover, due to the rechargeable battery, the problem of traditional bulbs needing constant electrical connection is solved, and the convenience of the bulb is greatly improved.

In this embodiment, a height of the multifunctional rechargeable magnetic attraction bulb is in a range from 30 mm to 200 mm. A diameter of the multifunctional rechargeable magnetic attraction bulb is in a range from 10 mm to 100 mm. A height of the outer tube 11 is in a range from 10 mm to 180 mm. A diameter of the outer tube 11 is in a range from 10 mm to 100 mm. A height of the base 3 is in a range from 5 mm to 100 mm. A diameter of the base 3 is in a range from 10 mm to 100 mm. A diameter of the top cover 5 is in a range from 5 mm to 100 mm. A height of the top cover 5 is in a range from 10 mm to 100 mm.

Preferably, the height of the multifunctional rechargeable magnetic attraction bulb is in a range from 103 mm to 105 mm. The diameter of the multifunctional rechargeable magnetic attraction bulb is in a range from 27 mm to 28 mm. The height of the outer tube 11 is in a range from 73.5 mm to 75 mm. The height of the top cover 5 is in a range from 7.5 mm to 8.5 mm. The height of the base 3 is in a range from 22 mm to 23 mm.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed:

1. A multifunctional rechargeable magnetic attraction bulb, comprising:

- a main body, wherein the main body comprises a hollow outer tube, the outer tube is capable of transmitting light, a first accommodating cavity is defined in the outer tube, and a light emitting component is provided inside the first accommodating cavity; the main body also comprises a hollow inner tube, and the hollow inner tube is positioned inside the first accommodating cavity; and
- a base, wherein the base is connected to one end of the outer tube, a magnetic attraction member is provided inside the base, and the base is attracted and connected to an attractable object through the magnetic attraction member;
- wherein another end of the outer tube away from the base is connected to a top cover, the outer tube and the top cover are respectively made of different materials; the top cover is rotatable relative to the outer tube and equipped with a touch sensing switch, an outside surface of the touch sensing switch is flush with an outside surface of the top cover.

2. The multifunctional rechargeable magnetic attraction bulb according to claim 1, wherein one end of the base attracted and connected to the attractable object is a flat end surface.

3. The multifunctional rechargeable magnetic attraction bulb according to claim 1, wherein the base is equipped with an indicator lamp; and the indicator lamp is used for displaying a charging state of the multifunctional rechargeable magnetic attraction bulb.

4. The multifunctional rechargeable magnetic attraction bulb according to claim 1, wherein a height of the multifunctional rechargeable magnetic attraction bulb is in a range from 30 mm to 200 mm; a diameter of the multifunctional rechargeable magnetic attraction bulb is in a range from 10 mm to 100 mm; a height of the outer tube is in a range from 10 mm to 180 mm; a diameter of the outer tube is in a range from 10 mm to 100 mm; a height of the base is in a range from 5 mm to 100 mm; a diameter of the base is in a range from 10 mm to 100 mm; a diameter of the top cover is in a range from 5 mm to 100 mm; and a height of the top cover is in a range from 10 mm to 100 mm.

5. The multifunctional rechargeable magnetic attraction bulb according to claim 1, wherein the magnetic attraction member is a magnet positioned inside the base.

6. The multifunctional rechargeable magnetic attraction bulb according to claim 5, wherein the magnet is a cylindrical magnet.

7. The multifunctional rechargeable magnetic attraction bulb according to claim 1, wherein the base is equipped with a rechargeable battery and a charging interface electrically connected to the rechargeable battery; and the rechargeable battery is electrically connected to the light emitting component for power supply.

8. The multifunctional rechargeable magnetic attraction bulb according to claim 7, wherein the rechargeable battery is received in the base and does not extend into the inner tube.

9. The multifunctional rechargeable magnetic attraction bulb according to claim 1, wherein both the base and the top cover are cylindrical bodies with an identical diameter to the outer tube.

10. The multifunctional rechargeable magnetic attraction bulb according to claim 9, wherein the base is a metal base; and the top cover is a metal top cover.

11. The multifunctional rechargeable magnetic attraction bulb according to claim 9, wherein the outer tube is circumferentially rotatable between the base and the top cover.

12. The multifunctional rechargeable magnetic attraction bulb according to claim 1, wherein the light emitting component comprises a circuit board and a light emitting element; the light emitting element is arranged on the circuit board; the circuit board is arranged on the hollow inner tube; and the light emitting element comprises at least one LED bead.

13. The multifunctional rechargeable magnetic attraction bulb according to claim 12, wherein the outer tube is a translucent plastic outer tube; and the hollow inner tube is an aluminum hollow inner tube.

14. The multifunctional rechargeable magnetic attraction bulb according to claim 12, wherein the touch sensing switch is used for adjusting a light emitting mode of the LED beads; when the touch sensing switch receives a first touch control signal, the touch sensing switch is used for switching the LED beads to a first light emitting mode; when the touch sensing switch receives a second touch control signal, the touch sensing switch is used for switching the LED beads to a second light emitting mode; and when the touch sensing switch receives a third touch control signal, the touch sensing switch is used for switching the LED beads to a third light emitting mode.

15. The multifunctional rechargeable magnetic attraction bulb according to claim 14, wherein the first light emitting mode, the second light emitting mode, and the third light emitting mode are all different light emitting modes from each other.

16. The multifunctional rechargeable magnetic attraction bulb according to claim 15, wherein the first light emitting mode is yellow light; the second light emitting mode is white light; and the third light emitting mode is mixed light of yellow light and white light.

17. The multifunctional rechargeable magnetic attraction bulb according to claim 12, wherein the circuit board is a flexible integrated circuit board; the flexible integrated circuit board is bent around to form an annular circuit board; the flexible integrated circuit board is arranged around the hollow inner tube; and the light emitting element is arranged around one side of the flexible integrated circuit board facing the outer tube.

18. The multifunctional rechargeable magnetic attraction bulb according to claim 17, wherein the light emitting element comprises a plurality of LED beads; and the plurality of LED beads are uniformly arranged around the flexible integrated circuit board.

19. The multifunctional rechargeable magnetic attraction bulb according to claim 18, wherein the LED beads are attached to the flexible integrated circuit board through surface mount technology; and the flexible integrated circuit board is attached to a surface of the hollow inner tube through adhesive.

20. The multifunctional rechargeable magnetic attraction bulb according to claim 18, wherein a total number of the LED beads is sixty; the sixty LED beads are divided into six layers; and each layer is arranged and distributed with ten of the LED beads.

* * * * *